United States Patent [19]
Gordon

[11] Patent Number: 5,959,609
[45] Date of Patent: *Sep. 28, 1999

[54] METHOD FOR DISPLAYING GRAPHICS

[75] Inventor: Ian R. Gordon, Ottawa, Canada

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/743,820

[22] Filed: Nov. 5, 1996

[51] Int. Cl.$^6$ ...................................................... G09G 5/22
[52] U.S. Cl. ........................................ 345/141; 345/112
[58] Field of Search ................................. 345/112, 141, 345/2

[56] References Cited

U.S. PATENT DOCUMENTS

| | | | |
|---|---|---|---|
| 3,909,792 | 9/1975 | Harris et al. | 340/172.5 |
| 4,837,737 | 6/1989 | Watanabe | 380/25 |
| 5,313,573 | 5/1994 | Takahama | 345/161 |
| 5,335,231 | 8/1994 | Kato | 395/183.07 |
| 5,392,337 | 2/1995 | Baals et al. | 379/96 |
| 5,402,477 | 3/1995 | McMahan et al. | 379/201 |
| 5,469,354 | 11/1995 | Hatakeyama et al. | 364/419.19 |
| 5,483,251 | 1/1996 | Dagdeviren | 345/141 |
| 5,590,245 | 12/1996 | Leamy et al. | 395/118 |
| 5,615,257 | 3/1997 | Pezzullo et al. | 379/396 |

FOREIGN PATENT DOCUMENTS 2118269 6/1995 Canada .

*Primary Examiner*—Amare Mengistu
*Assistant Examiner*—Ricardo Osorio

[57] ABSTRACT

A system and method for displaying text and graphics is provided. A subset of character codes from a character set are reserved to be associated with remotely redefinable pixel matrix definitions. After a connection to a remote server is made, pixel definitions are downloaded either interactively or in a script. Several of the pixel matrix definitions may be combined so as to display a graphic image.

17 Claims, 4 Drawing Sheets

METHOD FOR DISPLAYING GRAPHICS

FIELD OF THE INVENTION

The invention relates to a method and system for displaying graphics in a text based system.

BACKGROUND OF THE INVENTION

It is common for modern telephones to have a display capable of displaying text. The text may be received by the telephone over a telephone line from an application or script running on a remote source, or may be generated by an application running on the telephone itself which was downloaded from a remote source. Typically, the telephone is only capable of receiving and displaying standard ASCII characters which are represented by a character code consisting of a byte with a value from 00 hex to FF hex.

The default character set for one existing display based telephone design consists of the extended ASCII character set which includes all standard characters, plus international characters (to support languages that require accents), as well as box drawing characters for surrounding text with a single or double line. A disadvantage with this standard character set is that it does not allow any application defined graphics to be displayed.

The current ADSI (analog display services interface) protocol provides a standardized method of downloading characters in the standard character set to a display based telephone set, but does not provide for any way to display graphics on the display based telephone set.

In Canadian patent application 2,188,269 to Keen, published Jun. 8, 1995 a method is disclosed for displaying more than one font on a limited dot matrix display device. In addition to displaying characters in a standard font using all the pixels in a five by seven pixel matrix, a reduced four by six matrix is used to display characters with the pixels of the five by seven matrix left over being made available for underlining, inverse video etc. Adjacent five by seven pixel matrices are separated by a space on the display such that adjacent characters do not touch. This method does not provide for remote application specific redefinition of characters, and does not provide a way to display contiguous graphic images.

SUMMARY OF THE INVENTION

It is an object of the invention to obviate or mitigate the above identified disadvantages.

According to a first broad aspect, the invention provides a terminal for displaying text and graphics and connectable to a remote source, the terminal comprising: first memory for storing a non-redefinable pixel matrix definition in association with each of a first set of character codes; a second memory for storing a graphic character table consisting of a redefinable pixel matrix definition in association with each of a second set of character codes; a display; a receiver for receiving from the remote source commands of a first type each consisting of a pixel matrix definition and a character code belonging to said second set of character codes; a processor for executing commands of said first type by storing the received pixel matrix definition in the second memory in association with the received character code; the processor means also for executing commands of a second type originating from the remote source containing a particular character code to be displayed by reading from either the first memory or the second memory the pixel matrix definition associated with the particular character code and for causing a pixel matrix defined by the pixel matrix definition to be displayed on the display.

According to a second broad aspect, the invention provides a method for displaying text and graphics on a terminal connectable to a remote source, the terminal having a processor and having stored in a first memory a non-redefinable pixel matrix definition in association with each of a first set of character codes, the method comprising the steps of: allocating a second memory of said terminal for storing a graphic character table consisting of a redefinable pixel matrix definition in association with each of a second set of character codes; transmitting from the remote source to the terminal commands of a first type each consisting of a pixel matrix definition and a character code belonging to said second set of character codes; executing in the processor commands of said first type by storing the received pixel matrix definition in the second memory means in association with the received character code; executing in the processor commands of a second type originating from the remote source containing a particular character code to be displayed by reading from either the first memory or the second memory the pixel matrix definition associated with the particular character code and for causing a pixel matrix defined by the pixel matrix definition to be displayed on a display.

Advantageously, the invention allows the download and display of graphics in a system which normally only permits the display of text.

BRIEF DESCRIPTION OF THE DRAWINGS

Preferred embodiments of the invention will now be described with reference to the attached drawings in which:

FIGS. 2a and 2b contain a table of the IBM Extended ASCII character set;

DETAILED DESCRIPTION OF THE PREFERRED EMBODIMENTS

Figure 1:
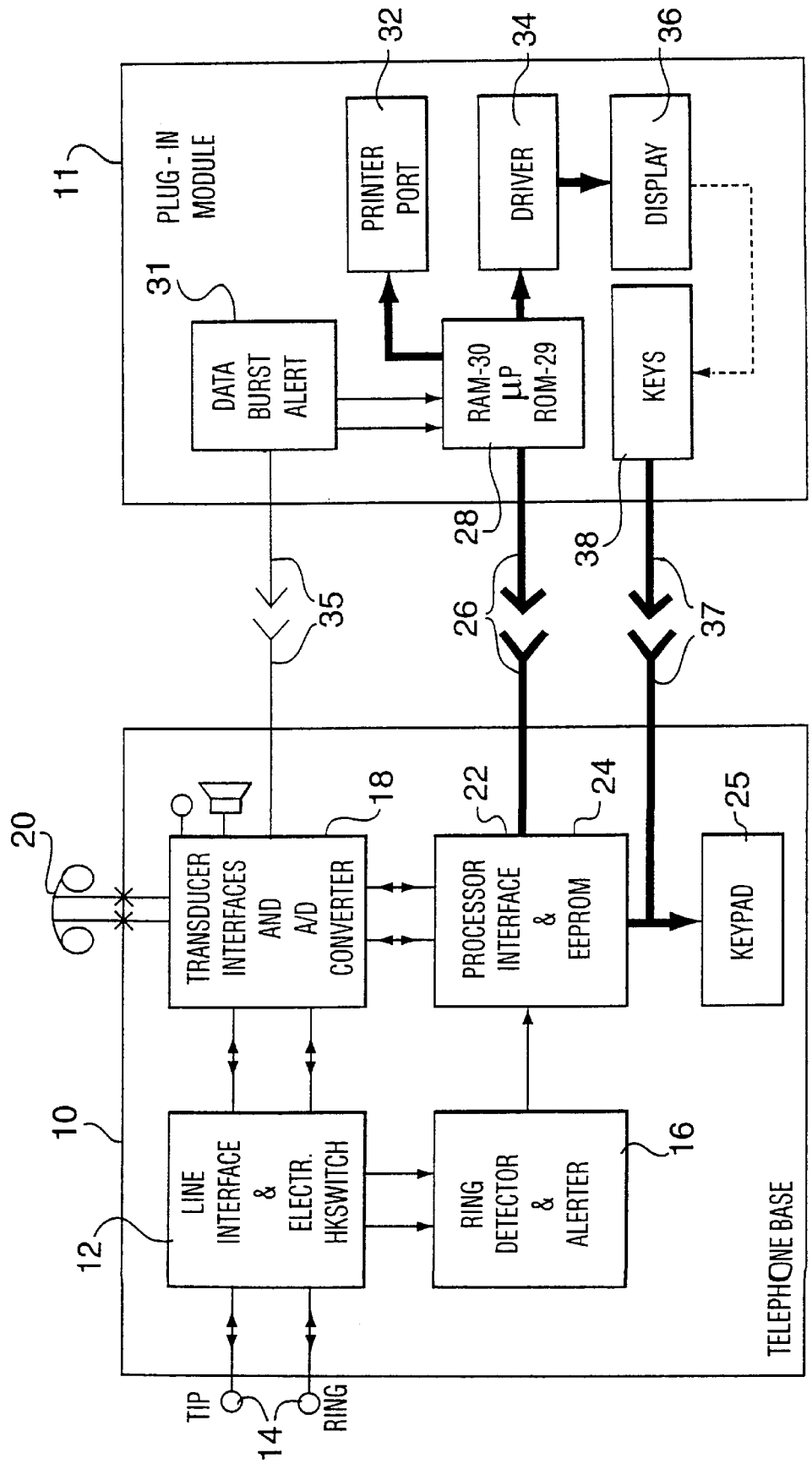
FIG. 1 is a block diagram of a display based telephone set equipped to display graphics according to the invention.

Referring firstly to FIG. 1, a block diagram of a telephone terminal equipped according to the inevention is shown with the blocks of a basic telephone set generally indicated by 10, and with the additional blocks of a plug-in module required to receive and display text generally indicated by 11.

The basic telephone 10 has a line interface and electronic hookswitch circuit 12 connected via tip and ring connections 14 to a PSTN (public switched telephone network) through which a connection may be made to a remote server (not shown). The line interface and electronic hookswitch circuit 12 is connected to a ring detector and alerter 16 and to a transducer interfaces and A/D converter block 18. The transducer interfaces and A/D converter block 18 contains a transducer interface for sending signals to a speaker (not shown) in a handset 20, a transducer interface for receiving signals from a microphone (not shown) in the handset 20, and also contains an A/D converter. The transducer interfaces and A/D converter block 18 and the ring detector and alerter 16 are each connected to a microprocessor interface circuit 22 having EEPROM 24. A conventional keypad 25 is also connected to the microprocessor interface circuit 22.

The plug-in module 11 includes a microprocessor 28 connected to the processor interface circuit 22 through connection 26, and also connected to a data burst alert circuit 31, a printer port 32, and a display driver 34. The microprocessor runs software code which is contained in built in ROM 29 and also has access to a RAM 30. The data burst alert circuit 31 is also connected with the transducer interfaces and A/D converter circuit 18 through a connection 35. The display driver 34 is connected to a display 36. The plug-in module may include additional keys on a keypad 38 which is connected to the processor interface circuit 22 through a connection 37. Connections 26, 35 and 37 are made when the plug-in module 11 is plugged into the basic telephone set 10.

Figure 2A:
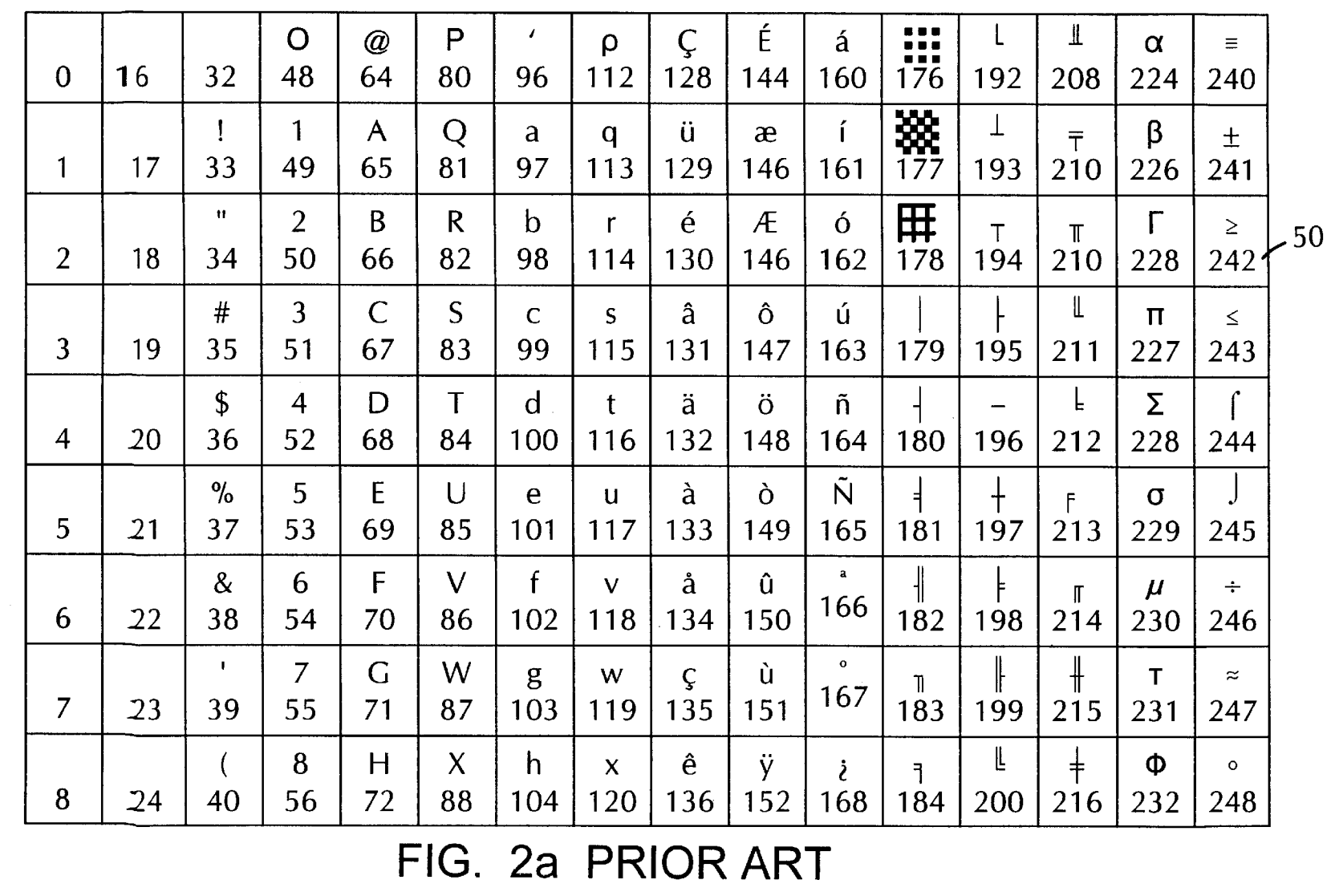
Figure 2B:
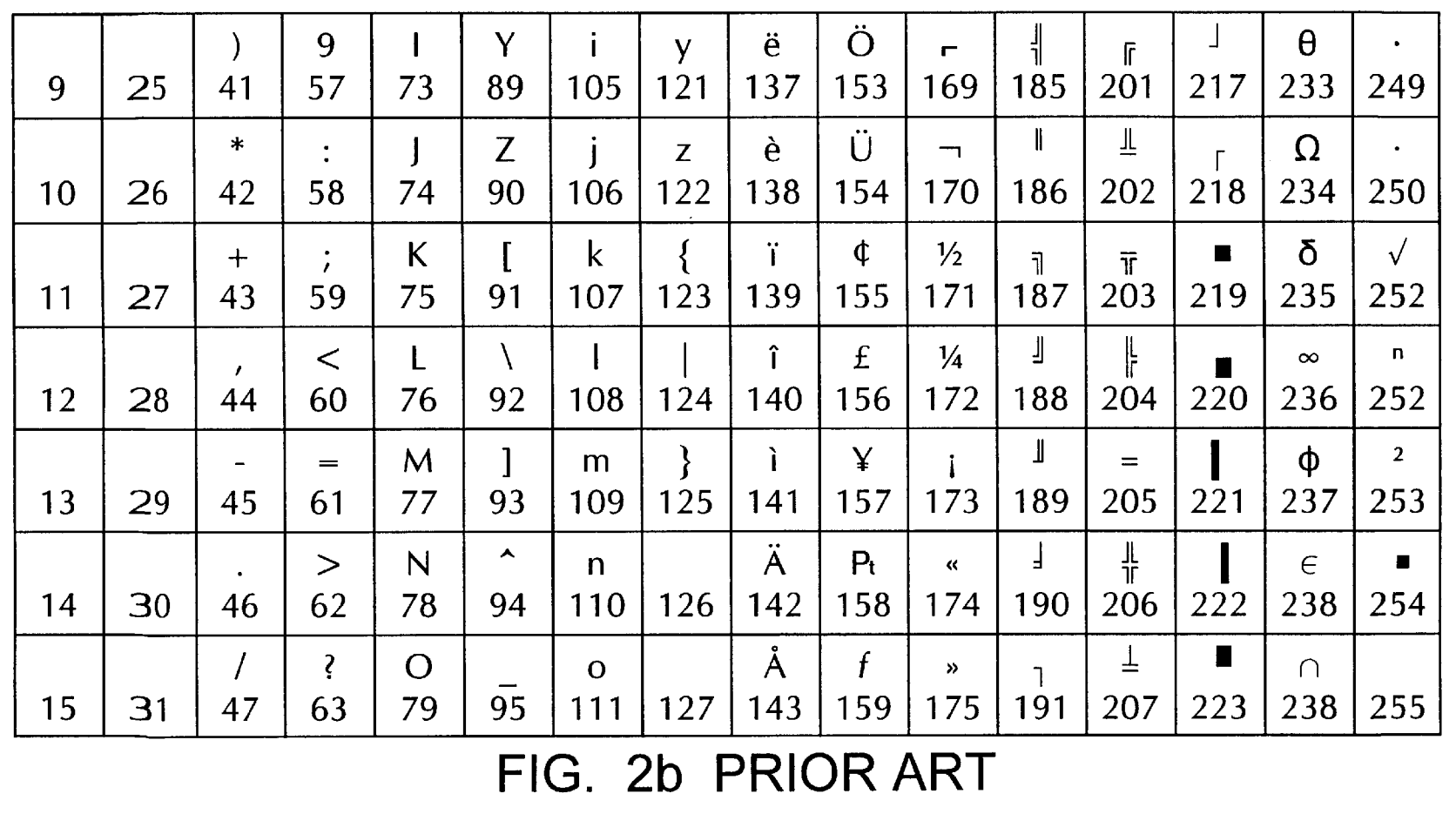
Figure 3:
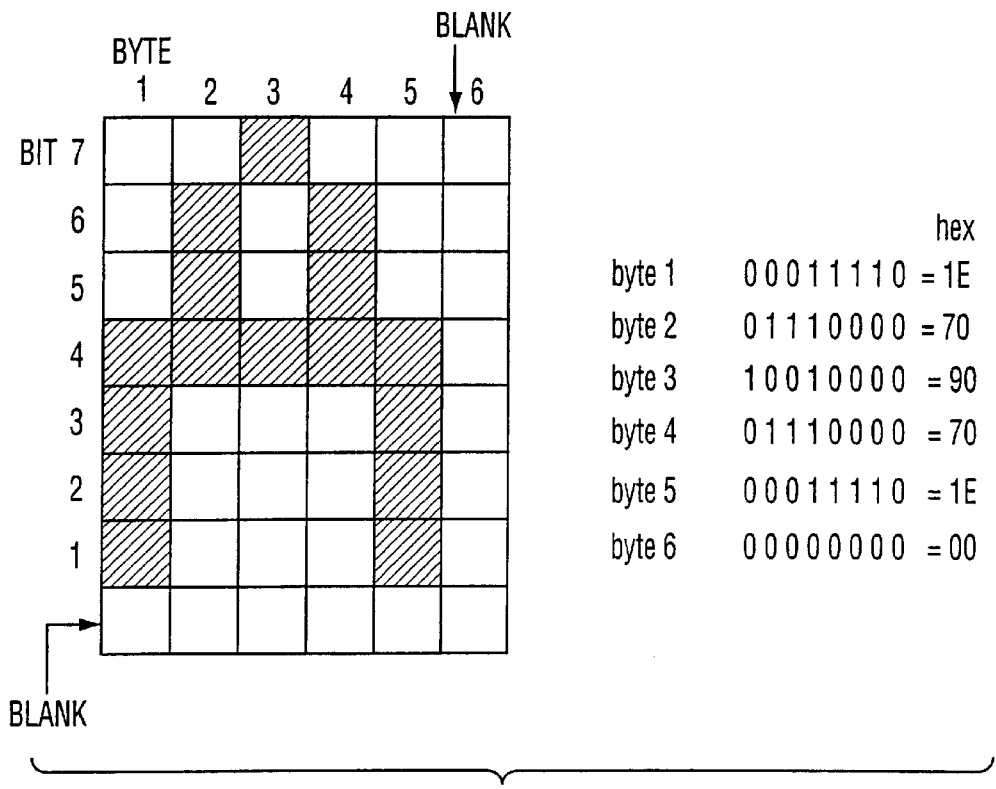
FIG. 3 is a matrix of pixels for an ASCII character.

The server (not shown) to which the telephone 10 may be connected is an interactive application server capable of sending and receiving data interactively from the telephone 10. The ADSI protocol defines how the interactive server and telephone 10 communicate with each other. In the ADSI protocol, an interactive session is referred to as an SDC (Server Display Control) session. During an SDC interactive session, the telephone 10 is off-hook and in communication with the interactive application server through the PSTN. The microprocessor 28 is typically programmed in its ROM to be able to display the characters of a particular character set, for example the IBM extended ASCII character set. FIGS. 2a and 2b contain a table of the characters included in the IBM extended ASCII character set. Each box of the table includes a character code written as a decimal number below the character represented by that character code. For example, one box 50 contains the character code consisting of the decimal number 242 below the "≧" character. In order to transmit an ASCII character, the binary equivalent of the character code for the desired character is sent in a command from the server. In hex, the ASCII character codes consist of the hex numbers in the range 00 to FF. Most of the IBM extended ASCII character set is displayed using a 5 by 7 matrix of pixels displayed within a 6 by 8 matrix of pixels so that there is always a one pixel blank space between adjacent characters. The IBM extended ASCII character set displays line and box characters (from 176 decimal to 223 decimal) using a 6 by 8 matrix of pixels so that contiguous lines and boxes can be displayed. The matrix of pixels for the ASCII character code 65 representing the letter "A" is shown in FIG. 3. The state of each pixel in a 6 by 8 matrix of pixels can be defined using a pixel matrix definition consisting of 6×8 =48 bits of information, or 6 bytes. One byte represents each column of the matrix, and one bit represents a pixel. In the example illustrated in FIG. 3, bytes 1 through 6 are equal to 1E, 70, 90, 70, 1E, 00 respectively.

Figure 4A:
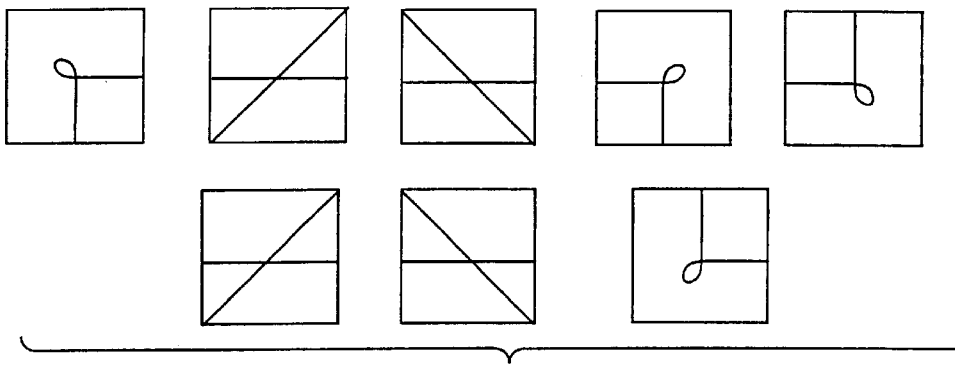
FIG. 4a is an example of multiple redefined graphic characters.
Figure 4B:
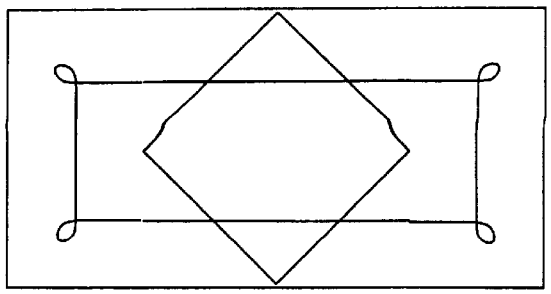
FIG. 4b is an example of the redefined graphic characters of FIG. 4a combined to form a logo.

According to the invention, a subset of a standard character set is made available for redefinition as graphic characters. This subset may include characters in the standard character set which represent undisplayable characters, or characters which will never be used. For example, in the ASCII character set tabulated in FIG. 2, characters with character code in the range of decimal 0 to decimal 31 represent non displayable characters and these may be reserved for redefinition. The remaining characters are non-redefinable and are used to display characters from the standard character set. For each non-redefinable character in the IBM extended ASCII character set (in this example this includes the ASCII codes from decimal 32 to decimal 255), the microprocessor has stored in ROM 29 a 6 byte pixel matrix definition in association with the character code for that character. For each redefinable character in the character set (in this example this includes the 32 ASCII character codes from decimal 0 to decimal 31 ), the microprocessor has stored in RAM 30 a 6 byte pixel matrix definition for that character. The redefinable pixel matrices may be used to display graphics. Since each redefinable pixel matrix is a 6 by 8 matrix of pixels, 32 character codes having redefined pixel matrices may be used to store an 8×4 array of codes for example, which in turn may be used to display a contiguous 48 pixel by 32 pixel graphic image. This size of pixel array is large enough to display a typical logo for example. An example of a graphic image is given in FIGS. 4a and 4b. The character code pixel matrix definitions for eight different character codes are shown in FIG. 4a. These are then displayed in two rows of four characters in FIG. 4b to display a contiguous logo.

In order to receive and display text through a command from an SDC interactive server, the interactive server (not shown) connected to the PSTN (not shown) downloads command data in the form of 1200 baud modem signals to the tip and ring connections 14. These signals pass through the line interface and electronic hookswitch circuit 12, through the transducer interfaces and A/D convertor block 18. The A/D converter samples the signals and converts them to digital signals. The digital signals are then passed through the processor interface circuit 22 which further processes the digital samples. The processed digital samples are passed to the program running on microprocessor 28. The microprocessor 28 decodes the digital samples into a command and takes appropriate action on the microprocessor RAM 30. If the command was to display a particular ASCII character on display 22, then the microprocessor determines based upon the ASCII code of the particular ASCII character whether the code corresponds to a non-redefinable character in which case it reads from ROM 29 the corresponding pixel matrix definition, or whether the code corresponds to a redefinable character in which case it reads from RAM 30 the corresponding pixel matrix definition. After the microprocessor has the 6 bytes of data defining the pixels to be displayed for that ASCII character it passes this data to the display driver which in turn causes the display of the character on display 36.

At any point during a session with an interactive server, the interactive server downloads application specific pixel matrix definitions for the redefinable characters. In other words, the redefinable characters are dynamically redefinable and together constitute a dynamically redefinable graphic character set. It does this by sending a command having a command type which indicates that a graphic character pixel matrix definition is to be downloaded. As an extension to the existing ADSI protocol, a new SDC interactive command is required. SDC interactive commands have the format (SDC Parameter type, Parameter length, parameters) where the SDC parameter type identifies the type of command, the parameter length identifies the length of the parameters in bytes, and the parameters field contains the actual parameters for the particular command. For the case of an SDC command to download a graphics character, the parameters field includes a character code parameter field which contains the particular character code of the character to be redefined and a pixel matrix definition parameter field which contains six bytes of data to define the pixel matrix for that character code. The fields for a new SDC interactive command to download a graphic character are summarized in Table I.

TABLE I

SDC Interactive command fields to download a graphic character definition

| SDC Parameter type | load graphic characters = 152 decimal, 98 hexadecimal | |
|---|---|---|
| Parameter length | 07 hexadecimal | |
| Parameters | character code | 00 to 1F hex |
| | pixel matrix definition | 6 bytes |

TABLE II

FDM Interactive command fields to download a graphic character definition

| FDM Parameter type | load graphic characters = 133 decimal, 86 hexadecimal | |
|---|---|---|
| Parameter length | 07 hexadecimal | |
| Parameters | character code | 00 to 01 hex |
| | pixel matrix definition | 6 bytes |

The microprocessor 28, after decoding the command, stores the six bytes in RAM in association with the respective character code. Typically, all of the redefinable character codes will be downloaded right at the start of the session. For a character set having 32 redefinable characters, 32×6 =192 bytes in RAM are required to define the respective pixel matrix definitions. At the end of an interactive session, the 192 bytes in RAM are cleared.

In the above described embodiment, the server is an SDC interactive server. Alternatively, the server may be a script server which downloads a script to the telephone set to be stored in the microprocessor RAM 30 and run autonomously by the microprocessor 28. The same server may be configured to operate both as an SDC interactive server and a script server. Scripts which are run autonomously on the user's equipment are defined in the ADSI protocol as FDM (feature download management) scripts.

In order to receive and display text through a command in an FDM script running autonomously on the microprocessor 28, the FDM script must have been previously downloaded into the microprocessor RAM 30 by a script server. Then each command in the script is processed by the microprocessor 28, and appropriate action is taken on RAM 30. If the command was to display a particular ASCII character on display 22, then the microprocessor determines based upon the ASCII code of the particular ASCII character whether the code corresponds to a non-redefinable character in which case it reads from ROM 29 the corresponding the pixel matrix definition, or whether the code corresponds to a redefinable character in which case it reads from RAM 30 the corresponding pixel matrix definition. After the microprocessor has the 6 bytes of data defining the pixels to be displayed for that ASCII character it passes this data to the display driver which in turn causes the display of the character on display 36.

As part of the script downloaded by the script server, the script defines application specific pixel matrix definitions for the redefinable characters. It does this by including a command in the script for each character to be redefined. The structure of the command in the script is similar to that downloaded by an interactive server as described above for the interactive server context. As an extension to the existing ADSI protocol, a new FDM script command is required. FDM script commands have the format (FDM Parameter type, Parameter length, parameters) where the FDM parameter type identifies the type of command, the parameter length identifies the length of the parameters in bytes, and the parameters field contains the actual parameters for the particular command. For the case of an FDM command to download a graphics character, the parameters field includes a character code parameter field which contains the particular character code of the character to be redefined and a pixel matrix definition parameter field which contains six bytes of data to define the pixel matrix for that character code. The fields for a new FDM interactive command to download a graphic character are summarized in Table II.

The microprocessor 28, after decoding the command, stores the six bytes in RAM in association with the respective character code. For a character set having 32 redefinable characters, 32×6 =192 bytes in RAM are required to define the respective pixel matrix definitions. When a new script is to be downloaded so as to overwrite an old script, the 192 bytes in RAM containing the graphics characters table for the old script are cleared.

In some cases, telephones may be equipped to store multiple downloaded FDM scripts while at the same time running an interactive session as described previously. In these cases, the RAM 30 would require 192 bytes of memory for each different script and for the interactive session. The 192 bytes if memory for each script or session may be referred to as the graphic character table.

An interactive application may also be given access to the graphic characters defined for a specific downloaded FDM script by providing a script number and security code for example. This would cause the graphic character table defined for the specified downloaded script to be automatically copied into the graphic characters table for the interactive session.

Numerous modifications and variations of the present invention are possible in light of the above teachings. It is therefore to be understood that within the scope of the appended claims, the invention may be practised otherwise than as specifically described herein.

Although the illustrated embodiment depicts the basic telephone 10 separate from the plug-in module 11, these could be implemented as a single integrated device.

Although a preferred embodiment has been described in which codes decimal 0 to decimal 31 of the IBM extended ASCII character set have been used to store redefined graphic characters, other codes from the same character set may be used, or a different character set altogether may be used.

Although an embodiment of the invention has been described in which a subset of a set of available character codes are redefined so as to allow the display of graphics, a temporary buffer may be provided for storing the entire standard character set, thereby permitting the down loading of graphic character definitions for all of the characters codes. This would allow the display of much more complex graphic images. In this case the graphic character codes would include all the codes from 00 to FF. After the display is complete, the standard character set is reloaded to permit the display of text.

Although the invention has been described in the context of a system utilizing the ADSI protocol, this is not essential. In any system in which character codes are downloaded to display associated pixel matrix definitions on a display, a subset of the pixel matrix definitions for the character codes may be reserved for remote definition so as to allow application specific graphic images to be displayed.

Although the invention has been described with reference to the standard 6×8 pixel matrix for displaying characters, this is not essential. Whatever pixel matrix size used to display the normal characters in the character set may be used to store graphics characters.

Specific examples for parameter types for SDC interactive commands have been given, but depending on the particular context of the application, any appropriate types could be used.

The embodiments of the invention in which an exclusive property or privilege is claimed are defined as follows:

1. A method of displaying graphics on a screen-based telephone set connectable to a telecommunications network and capable of displaying characters from a standard character set, the set identified by a unique set of character codes, comprising the steps of:

dividing the set of character codes into a predetermined first set of codes which will continue to identify characters from said standard character set, and a predetermined second set of codes which will identify characters from a dynamically redefinable graphic character set;

receiving through the telecommunications network commands of a first type consisting of a received character code belonging to said second set of character codes, and a received pixel matrix definition to be associated with the received character code;

executing the command of the first type by storing the received pixel matrix definition in memory in association with the received character code thereby defining a character in said dynamically redefinable graphic character set;

receiving through the telecommunications network a command of a second type containing a character code from said unique set;

executing the command of a second type by determining whether the received code belongs to said first set or said second set, and if it belongs to the first set then displaying the associated character from the standard character set, and if it belongs to the second set then displaying the associated character from the dynamically redefinable graphic character set.

2. A method according to claim 1 further comprising the steps of:

receiving through the telecommunications network a script containing commands of said first type and commands of said second type and storing this in memory in association with a soft key;

upon selection of the soft key, executing the commands of said first type and said second type contained in the script.

3. A method according to claim 1 wherein said standard character set is the ASCII character set.

4. A method according to claim 1 wherein said commands of said first type each contain an identification that the command is a command of said first type, a byte identifying the character code from said second set, and six bytes identifying a six by eight pixel matrix definition, with one bit of the six bytes identifying a state of each pixel in the six by eight pixel definition.

5. A method according to claim 1 wherein said commands of said first type and second type are received according to the ADSI protocol.

6. A method according to claim 1 wherein each said character in said standard character set is defined by a five by seven pixel matrix definition, and each said character in said dynamically redefinable character set is a six by eight pixel matrix definition, wherein characters of either said first type or said second type are both displayed on six by eight pixel matrix display areas, and when characters from said static character are displayed, a one pixel wide area left over causes each character to be separated from each other, thereby allowing the alphanumeric text to be easily read, and wherein when characters from said dynamically redefinable character set are displayed, there is no space between characters or rows of characters thereby allowing contiguous graphic images larger than just a single six by eight matrix to be displayed.

7. A method of displaying a graphic image on a screen-based telephone set connected to a telecommunications network and capable of displaying characters from a standard character set, the set identified by a unique set of character codes, comprising the steps of:

dividing the unique set of character codes into a first set of codes which will continue to identify characters from said standard character set, and a second set of codes which will identify characters from a dynamically redefinable graphic character set;

dividing the graphic image into a plurality of sub-images;

for each said sub-image, a network entity forming part of said telecommunications network sending through the telecommunications network to the telephone set a command of a first type consisting of a sent character code belonging to said second set of character codes, and a sub-image pixel matrix definition to be associated with the character code;

the telephone set receiving the command of the first type, and executing the command of the first type by storing the sent pixel matrix definition in memory in association with the sent character code thereby defining a character in said dynamically redefinable graphic character set;

the network entity sending through the telecommunications network a plurality of commands of a second type containing a character code from said unique set, one for each associated sub-image in sequence;

the telephone set receiving the commands of the second type, and executing the commands of a second type by displaying the associated sub-image pixel matrix definitions in a contiguous manner thereby resulting in the display of said graphic image on the screen-based telephone set.

8. A method according to claim 7 further comprising the steps of:

the network entity sending a script containing commands of said first type and commands of said second type;

the telephone set receiving the script and storing it in memory in association with a soft key;

upon selection of the soft key, the telephone set executing the commands of said first type and said second type contained in the script.

9. A method according to claim 8 wherein said standard character set is the ASCII standard character set.

10. A method according to claim 8 wherein said commands of said first type each contain an identification that the command is a command of said first type, a byte identifying the character code from said second set, and six bytes identifying a six by eight pixel matrix definition, with one bit of the six bytes identifying a state of each pixel in the six by eight pixel definition.

11. A method according to claim 8 wherein said commands of said first type and second type are sent and received according to the ADSI protocol.

12. A screen based telephone set for connection to a telecommunications network comprising:

a display;

a first memory containing pixel matrix definitions for static characters belonging to a standard character set, the set identified by a unique set of character codes;

a second memory for storing pixel matrix definitions for redefinable characters belonging to a dynamically redefinable graphic character set, the characters in said dynamically redefinable graphic character set being identified by a predetermination subset of said unique set of character codes, any codes in said unique set and not in said subset being referred to as a first set of character codes, and the subset being referred to as a second set of character codes;

a receiver for receiving through the telecommunications network commands of a first type consisting of a received character code belonging to said second set of character codes, and a received pixel matrix definition to be associated with the character code, and for receiving through the telecommunications network a command of a second type containing a character code from said unique set; and a processor programmed to execute the command of the first type by storing the received pixel matrix definition in memory in association with the received character code thereby defining a character in said dynamically redefinable graphic character set, and programmed to execute the command of a second type by determining whether the received code belongs to said first set or said second set, and if it belongs to the first set then displaying on the display the associated character from the standard character set, and if it belongs to the second set then displaying on the display the associated character from the dynamically redefinable graphic character set.

13. A telephone set according to claim 12 further comprising:

a third memory for storing a script;

a soft key which when selected runs the script stored in the third memory;

said receiver also being for receiving the script through the telecommunications network and storing it in said third memory, said script containing commands of said first type and commands of said second type.

14. A telephone set according to claim 12 wherein said standard character set is the ASCII standard character set.

15. A telephone set according to claim 12 wherein commands of said first type each contain an identification that the command is a command of said first type, a byte identifying the character code from said second set, and six bytes identifying a six by eight pixel matrix definition, with one bit of the six bytes identifying a state of each pixel in the six by eight pixel definition.

16. A telephone set according to claim 12 wherein said commands of said first type and second type are received according to the ADSI protocol.

17. A telephone set according to claim 12 wherein said display comprises a plurality of six by eight pixel matrix displays located contiguously in rows and columns, and each of said static character is a five by seven pixel matrix definition which when displayed in one of said six by eight pixel matrix displays leaves a spacing row and column between adjacent rows and columns of displayed characters, and wherein each said redefinable character is a six by eight pixel matrix definition which when displayed in one of said six by eight pixel matrix displays does not leave any spacing rows or columns between adjacent displayed characters thereby allowing composite graphic images composed of a plurality of contiguously displayed redefinable characters to be displayed.

* * * * *